United States Patent
Brooks

(10) Patent No.: US 10,875,537 B1
(45) Date of Patent: Dec. 29, 2020

(54) SYSTEMS AND METHODS FOR MONITORING THE SITUATIONAL AWARENESS OF A VEHICLE ACCORDING TO REACTIONS OF A VEHICLE OCCUPANT

(71) Applicant: Toyota Research Institute, Inc., Los Altos, CA (US)

(72) Inventor: Daniel J. Brooks, Arlington, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/509,807

(22) Filed: Jul. 12, 2019

(51) Int. Cl.
  G08B 23/00 (2006.01)
  B60W 40/08 (2012.01)
  G06K 9/00 (2006.01)
  G06F 3/01 (2006.01)
  G05D 1/00 (2006.01)

(52) U.S. Cl.
  CPC ........... *B60W 40/08* (2013.01); *G05D 1/0061* (2013.01); *G06F 3/013* (2013.01); *G06K 9/00845* (2013.01); *B60W 2040/0818* (2013.01); *G05D 2201/0213* (2013.01)

(58) Field of Classification Search
  CPC .......... B60W 40/08; B60W 2040/0818; G05D 1/0061; G05D 2201/0213; G06F 3/013; G05K 9/00845
  See application file for complete search history.

(56) References Cited

U.S. PATENT DOCUMENTS

| | | |
|---|---|---|
| 9,754,325 B1 | 9/2017 | Konrardy et al. |
| 10,163,018 B1 * | 12/2018 | Chan .................. G06F 16/50 |
| 2009/0040054 A1 | 2/2009 | Wang et al. |
| 2011/0261199 A1 * | 10/2011 | Schmidt ................ G08G 1/166 348/148 |
| 2012/0319869 A1 * | 12/2012 | Dorfmann .............. G08B 21/06 340/945 |
| 2015/0363657 A1 * | 12/2015 | Shigemura ......... G06K 9/00845 382/104 |
| 2018/0099679 A1 * | 4/2018 | Huang .................. B60W 50/16 |
| 2018/0314947 A1 | 11/2018 | Morris et al. |
| 2018/0339712 A1 | 11/2018 | Kislovskiy et al. |
| 2018/0342113 A1 | 11/2018 | Kislovskiy et al. |
| 2019/0263419 A1 * | 8/2019 | Prakah-Asante ..... B60W 40/09 |
| 2020/0062275 A1 * | 2/2020 | Higgins ............. G06K 9/00845 |

* cited by examiner

*Primary Examiner* — Phung Nguyen
(74) *Attorney, Agent, or Firm* — Christopher G. Darrow; Darrow Mustafa PC

(57) ABSTRACT

System, methods, and other embodiments described herein relate to identifying when a situational awareness of a vehicle is inconsistent with a surrounding environment. In one embodiment, a method includes analyzing occupant sensor data about at least one occupant of the vehicle to generate a reaction level of the occupant. The reaction level characterizes at least a current response of the occupant to the surrounding environment and control of the vehicle within the surrounding environment. The method includes comparing an expected reaction for the occupant with the reaction level to determine whether the reaction level of the occupant correlates with the situational awareness of the vehicle about the surrounding environment. The method includes, in response to identifying that the reaction level does not correlate with the expected reaction, executing, by the vehicle, a responsive action to account for inconsistencies in the situational awareness of the vehicle.

20 Claims, 6 Drawing Sheets

SYSTEMS AND METHODS FOR MONITORING THE SITUATIONAL AWARENESS OF A VEHICLE ACCORDING TO REACTIONS OF A VEHICLE OCCUPANT

TECHNICAL FIELD

The subject matter described herein relates, in general, to identifying when a vehicle that operates at least semi-autonomously has incomplete situational awareness about a surrounding environment, and, more particularly, to monitoring reactions of a vehicle occupant as a point of comparison to determine when the situational awareness of the vehicle is incomplete.

BACKGROUND

Machine perception and reasoning may rely extensively on information from sensors that perceive a surrounding environment. Generally, the machine analyzes the sensor information to resolve understanding about the surrounding environment. In the context of a vehicle that operates at least semi-autonomous systems, the vehicle models the surrounding environment using the sensor information and various processing routines to develop situational awareness about aspects that may affect the vehicle. The processing routines can include machine learning algorithms (e.g., deep learning neural networks), statistical models, and other mechanisms for transforming the sensor information into perceptions that embody the situational awareness about the surrounding environment. Advanced driving assistance systems (ADAS), semi-autonomous systems, and/or fully autonomous systems of the vehicle use the developed situational awareness to execute and/or plan actions for the vehicle.

However, the sensors and the processing routines that the vehicle employs to generate the situational awareness can encounter difficulties under various circumstances. For example, the sensors function according to their respective designs to produce the sensor information. This generally entails functioning according to conditions that are robust but nevertheless have limits that can result in inaccuracies within the sensor information. For example, a particular camera may operate to produce images within a range of lighting conditions. Consequently, when the lighting conditions exceed the operating range (either from an absence or excess amount of light), the camera may produce the sensor information with inaccuracies about the surrounding environment (e.g., image aberrations from sun glare that obscures a portion of a field-of-view).

Moreover, the processing routines that use the sensor information may independently encounter separate difficulties. That is, because the processing routines generally function according to: training data that embodies situations the vehicle may encounter, explicitly programmed correlations, and/or further defined mechanisms, the processing routines may provide inaccurate or incomplete reasoning about the surrounding environment when, for example, characteristics of the surrounding environment extend to edge cases that are beyond defined understandings of the processing routines. Consequently, the noted instances of difficulties in acquiring the sensor data, difficulties in producing the determinations, and/or combination of the two may result in a failure of the systems to adequately perform respective functions, which can influence the usability of such systems.

SUMMARY

Example systems and methods disclosed herein relate to identifying when automated/autonomous systems of a vehicle generate a situational awareness about the surrounding environment that is incomplete or otherwise inconsistent with aspects of the environment that are actually present. For example, in one approach, a system gauges the situational awareness of the vehicle against reactions of a vehicle occupant. As the vehicle progresses through an environment, a vehicle occupant (e.g., operator) reacts to what is occurring around the vehicle so long as the operator is vigilant about the environment. The reactions of the vehicle occupant manifest through, for example, both physiological responses (e.g., heart rate, blood pressure, etc.) and outward behavioral responses (e.g., movements, eye gaze, expressions, etc.).

Accordingly, the disclosed approach, in one embodiment, exploits the correlation between reactions of the vehicle occupant and aspects relating to the surrounding environment to assess situational awareness of the vehicle. As such, in one approach, a disclosed system correlates perceived attributes of the surrounding environment with expected reactions of the vehicle occupant and actually perceived reactions of the vehicle occupant. Thus, in one embodiment, the disclosed approach monitors the vehicle occupant to derive a reaction of the occupant to the surrounding environment and how the vehicle is proceeding through the environment. The disclosed system can then compare the perceived reaction of the vehicle occupant to an expected reaction that correlates with the perceptions of the vehicle to identify instances where there is a mismatch. In general, the mismatch indicates that some aspect of the situational awareness of the vehicle is inaccurate/incomplete. In these instances, the disclosed system can, for example, perform one or more actions such as logging information about the occurrence, further analyzing the surroundings, handing off control, and so on. In this way, the disclosed approach improves the identification of instances where the vehicle has incomplete or inaccurate situational awareness and also improves the functioning of the vehicle during and after the occurrence by adapting a response and/or logging information to subsequently improve associated vehicle systems.

In one embodiment, an introspection system for identifying when a situational awareness of a vehicle is inconsistent with a surrounding environment is disclosed. The system includes one or more processors and a memory communicably coupled to the one or more processors. The memory stores a monitoring module including instructions that when executed by the one or more processors cause the one or more processors to analyze occupant sensor data about at least one occupant of the vehicle to generate a reaction level of the occupant. The reaction level characterizes at least a current response of the occupant to the surrounding environment and control of the vehicle within the surrounding environment. The memory stores an inspection module including instructions that when executed by the one or more processors cause the one or more processors to compare an expected reaction for the occupant with the reaction level to determine whether the reaction level of the occupant correlates with the situational awareness of the vehicle about the surrounding environment. The inspection module includes instructions to, in response to identifying that the reaction level does not correlate with the expected reaction, execute a responsive action to account for inconsistencies in the situational awareness of the vehicle.

In one embodiment, a non-transitory computer-readable medium for identifying when a situational awareness of a vehicle is inconsistent with a surrounding environment and including instructions that when executed by one or more processors cause the one or more processors to perform one or more functions is disclosed. The instructions include instructions to analyze occupant sensor data about at least one occupant of the vehicle to generate a reaction level of the occupant. The reaction level characterizes at least a current response of the occupant to the surrounding environment and control of the vehicle within the surrounding environment. The instructions include instructions to compare an expected reaction for the occupant with the reaction level to determine whether the reaction level of the occupant correlates with the situational awareness of the vehicle about the surrounding environment. The instructions include instructions to, in response to identifying that the reaction level does not correlate with the expected reaction, execute a responsive action to account for inconsistencies in the situational awareness of the vehicle.

In one embodiment, a method for identifying when a situational awareness of a vehicle is inconsistent with a surrounding environment is disclosed. In one embodiment, the method includes analyzing occupant sensor data about at least one occupant of the vehicle to generate a reaction level of the occupant. The reaction level characterizes at least a current response of the occupant to the surrounding environment and control of the vehicle within the surrounding environment. The method includes comparing an expected reaction for the occupant with the reaction level to determine whether the reaction level of the occupant correlates with the situational awareness of the vehicle about the surrounding environment. The method includes, in response to identifying that the reaction level does not correlate with the expected reaction, executing, by the vehicle, a responsive action to account for inconsistencies in the situational awareness of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
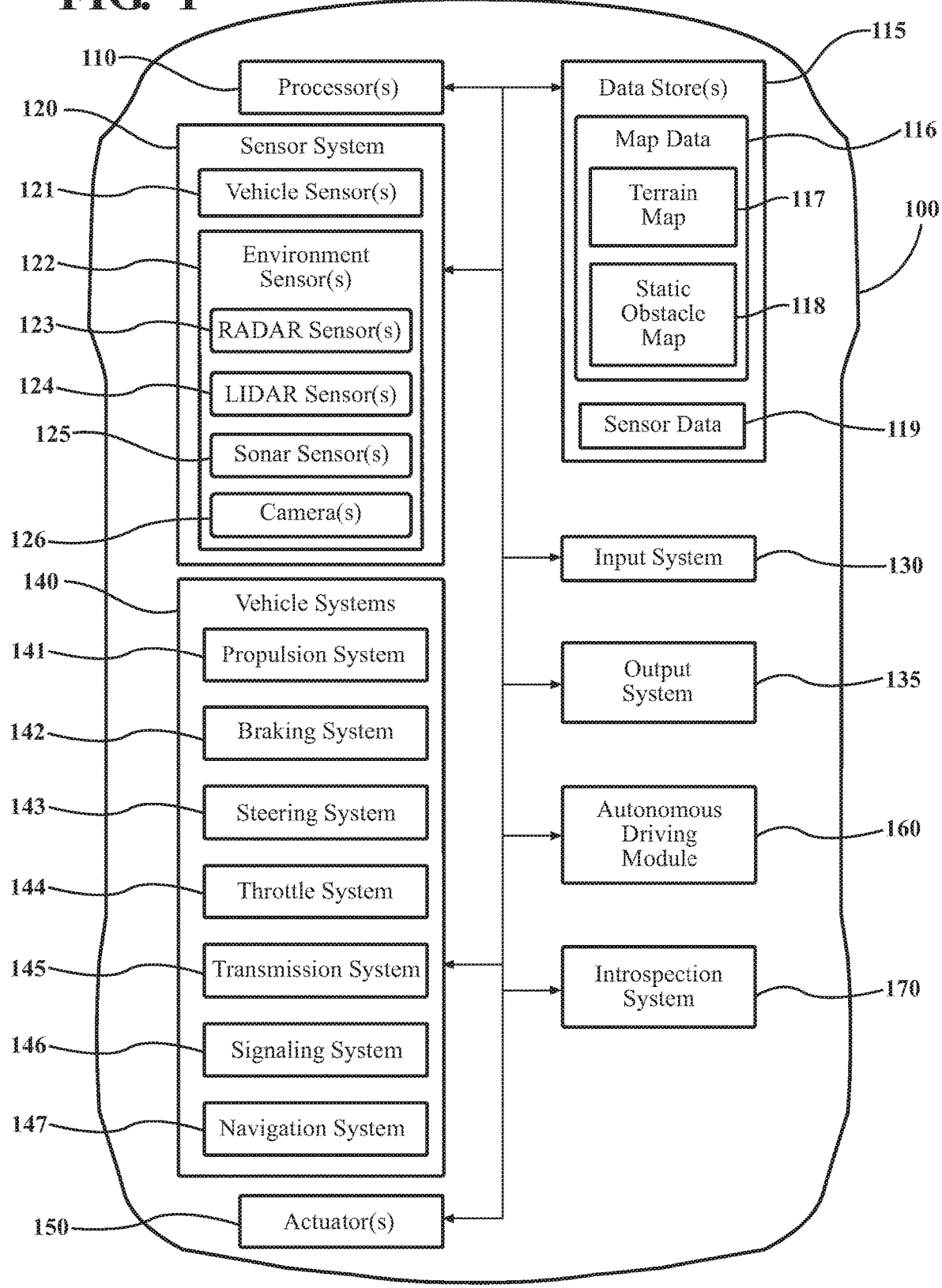
FIG. 1 illustrates one embodiment of a vehicle within which systems and methods disclosed herein may be implemented.

Systems, methods, and other embodiments associated with improving the identification of incomplete/inaccurate situational awareness of vehicle systems are disclosed. As previously noted, various perception and reasoning components of automated/autonomous systems within a vehicle may encounter difficulties associated with long-tail events. That is, when a vehicle encounters a rare occurrence of circumstances, whether beyond the operating bounds of sensors or the understanding of reasoning components, the vehicle systems may not effectively resolve the circumstances because of incomplete/inaccurate awareness about the environment. Such incomplete awareness can result in the inability to perform respective functions.

Therefore, example systems and methods disclosed herein relate to identifying when automated/autonomous systems of a vehicle develop situational awareness that is incomplete or otherwise inconsistent with aspects of the environment that are actually present. For example, in one approach, a system assesses the situational awareness of the vehicle against reactions of a vehicle occupant. In other words, as the vehicle progresses through an environment, a vehicle occupant (e.g., operator, passenger, etc.) reacts to what is occurring around the vehicle assuming that the operator is engaged with actions of the vehicle relative to the environment. The reactions of the vehicle occupant manifest through, for example, physiological responses (e.g., heart rate, blood pressure, etc.) and outward behavioral responses (e.g., movements, eye gaze, expressions, etc.).

As such, the disclosed system monitors the vehicle occupant, which may be an operator, a passenger, or a combination thereof, to determine the reactions and assign a reaction level accordingly. In one approach, the system further uses the reaction level to characterize the reactions and whether the reactions correlate with current events/aspects of the surrounding environment. Because a vehicle occupant may not always be vigilant about the operation of the vehicle and the surrounding environment, the reactions may not always correlate with the surrounding environment. Thus, the disclosed system can further assess the vigilance of the occupant and indicate, for example, a confidence score for the reactions (i.e., an extent to which the reactions reliably correspond with actions of the vehicle relative to the surroundings) as the reaction level. In this way, the system can better correlate the reactions of the occupant with the situational awareness of the vehicle.

Accordingly, the disclosed approach, in one embodiment, exploits the correlation between reactions of the vehicle occupant with aspects relating to the surrounding environment to assess situational awareness of the vehicle. In one approach, a disclosed system correlates perceived attributes of the surrounding environment with expected reactions or levels of reactions of the vehicle occupant. Thus, the disclosed system, for example, derives a reaction of the occupant to the surrounding environment and how the vehicle is proceeding through the environment. The disclosed system can then compare the perceived reaction of the vehicle occupant to an expected reaction that correlates with the perceptions of the vehicle thereby identifying instances where the vehicle is, for example, not fully aware of the surrounding environment.

By way of example, the vehicle occupant may be intently gazing at a particular area or object in the environment while mannerisms and/or a physiological response of the occupant indicates elevated stress. By contrast, the autonomous/automated systems of the vehicle do not indicate the presence of an object of concern within the corresponding location to the occupant's gaze, and thus the expected reaction level does not match the reaction of the occupant. This mismatch may be indicative of an incomplete/inaccurate situational awareness of the vehicle. For example, the occupant may be viewing an object such as another vehicle that is on an intersecting trajectory with the vehicle. However, because the vehicle has incomplete knowledge of the intersecting trajectory and/or the other vehicle itself, the autonomous/automated systems are not initiating mitigating controls/actions.

In such instances, the disclosed system can, for example, perform one or more actions in recognition of the mismatch. In various approaches, the disclosed system can perform actions such as logging information about the occurrence, executing supplemental analysis of the surroundings (e.g., scheduling additional processing of sensor data, offloading processing to a cloud-component, etc.), handing off control to the occupant or a remote operator, and so on. In this way, the disclosed approach improves the identification of instances where the vehicle has incomplete or inaccurate situational awareness and also improves the functioning of the vehicle during and after the occurrence by executing a response to mitigate the immediate difficulty and/or logging information to subsequently improve associated vehicle systems.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein. In various embodiments, the automated/autonomous systems or combination of systems may vary. For example, in one aspect, the automated system is an advanced driving assistance system (ADAS) such as a collision prevention system, lane departure system, and so on. In a further aspect, the autonomous system is a system that provides autonomous control of the vehicle according to one or more levels of automation such as the levels defined by the Society of Automotive Engineers (SAE) (e.g., levels 0-5). As such, the autonomous system may provide semi-autonomous control or fully autonomous control as discussed in relation to the autonomous driving module 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes an introspection system 170 that functions to improve the determinations provided by various vehicle systems through identifying when the vehicle systems generate predictions, perceptions, plans, classifications, identifications, or other determinations that are inaccurate or otherwise incomplete. Because the vehicle relies on the noted determinations to control the vehicle and/or provide warnings or other functions, inaccuracies in the determinations can result in the situational awareness of the vehicle being inaccurate or incomplete with respect to aspects of the environment that may affect the vehicle. As such, when the situational awareness does not accurately track the surrounding environment, the noted systems may not sufficiently perform their respective functions.

Thus, the introspection system 170 leverages a secondary point of comparison in the vehicle occupant(s) as a mechanism for determining when the situational awareness of the noted systems in the vehicle may be inaccurate. Moreover, while depicted as a standalone component, in one or more embodiments, the introspection system 170 is integrated with the autonomous driving module 160, or another component of the vehicle 100. Thus, the introspection system 170 may be integrated into another component for which the introspection system 170 is providing oversight. The noted functions and methods will become more apparent with a further discussion of the figures.

Figure 2:
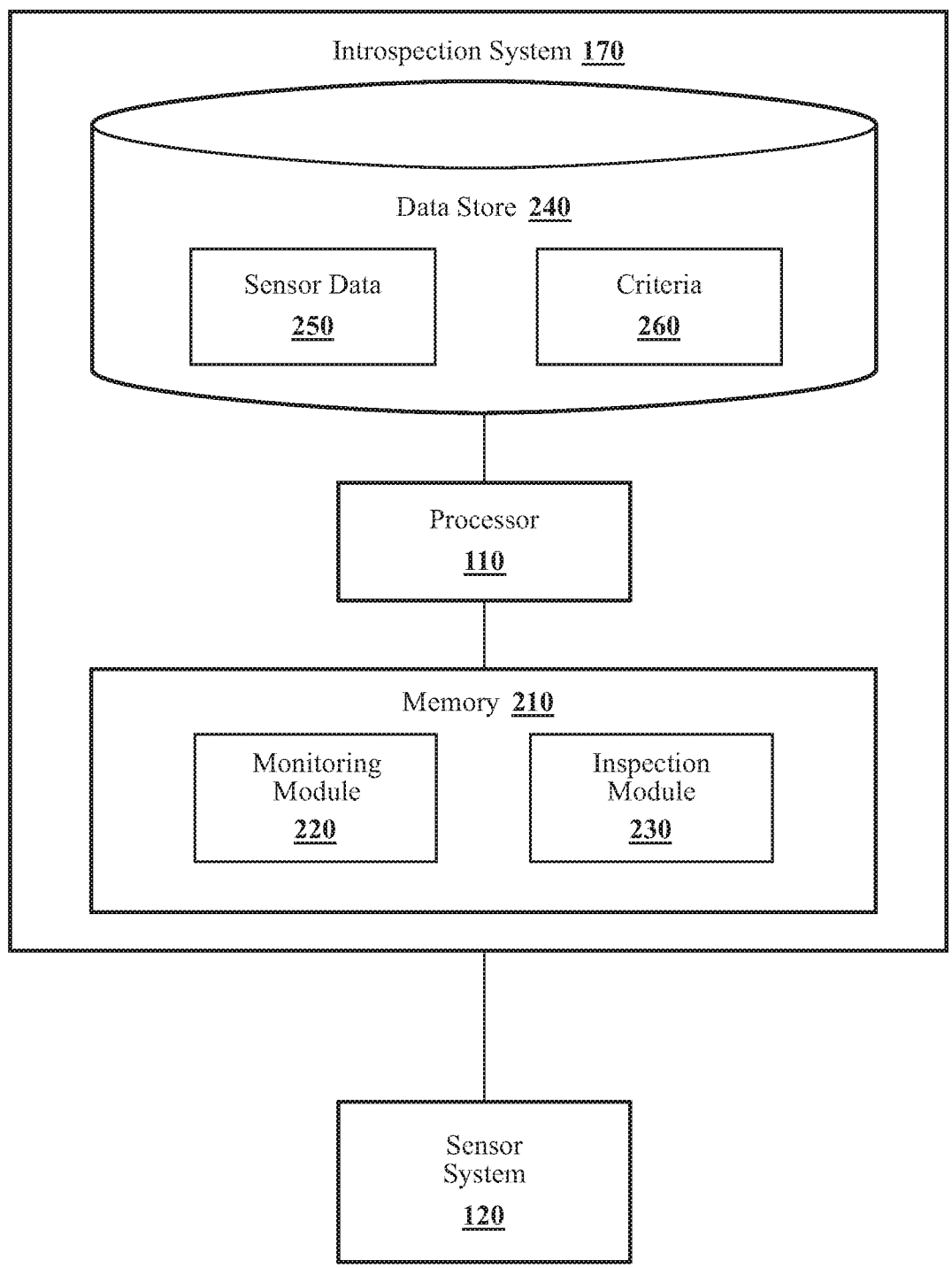
FIG. 2 illustrates one embodiment of an introspection system that is associated with improving the identification of inconsistencies in the situational awareness of vehicle systems.

With reference to FIG. 2, one embodiment of the introspection system 170 is further illustrated. As shown, the introspection system 170 includes a processor 110. Accordingly, the processor 110 may be a part of the introspection system 170 or the introspection system 170 may access the processor 110 through a data bus or another communication path. In one or more embodiments, the processor 110 is an application specific integrated circuit that is configured to implement functions associated with a monitoring module 220 and an inspection module 230. In general, the processor 110 is an electronic processor such as a microprocessor that is capable of performing various functions as described herein. In one embodiment, the introspection system 170 includes a memory 210 that stores the monitoring module 220 and the inspection module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the introspection system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, and criteria 260 along with, for example, other information that is used by the modules 220 and 230.

Accordingly, the monitoring module 220 generally includes instructions that function to control the processor 110 to receive data inputs from one or more sensors of the vehicle 100 that form the sensor data 250. In other words, the monitoring module 220 includes instructions to acquire occupant state information that characterizes physiological responses and behaviors of the occupant. Thus, the sensor data 250 includes, in at least one approach, information about a present mental state of the occupant, present actions of the occupant, a direction of gaze of the occupant, autonomic responses of the occupant, biological responses/conditions of the operator, and so on. It should be appreciated that the present disclosure provides an exemplary listing of aspects associated with the occupant that the monitoring module 220 can monitor to produce the occupant state information; however, this listing is not to be construed as limiting and is provided as an exemplary list of possibilities for purposes of this discussion.

Accordingly, by way of example, the occupant state information can further include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the occupant in the vehicle 100 (e.g., forward-facing, rear-facing, etc.), seat position (e.g., reclined, upright), rate of movement, facial feature movements (e.g., mouth, blinking eyes, moving head, etc.), characteristics of speech or other audible sounds of the occupant, and so on.

Additionally, the monitoring module 220 can determine the occupant state information in multiple different ways depending on a particular implementation. In one embodiment, the monitoring module 220 communicates with various sensors of the sensor system 120 including one or more of: camera(s) (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the occupant and/or aspects related to the occupant. Furthermore, the sensor system 120 can include multiple redundant ones of the sensors in order to, for example, improve accuracy/precision of collected state information.

Additionally, it should be appreciated that while a single vehicle occupant is generally discussed throughout this disclosure, the monitoring module 220, in one approach, simultaneously monitors multiple occupants of the vehicle 100 including front-seat passengers (e.g., an operator, a passenger) and rear-seat passengers. Thus, the introspection system 170 can selectively assess the situational awareness of the vehicle against reactions of one or more occupants in the vehicle 100.

In either case, the monitoring module 220 uses the noted state information about the occupant (also referred to as a passenger herein) to generate the reaction level of the passenger(s). It should be appreciated, in various embodiments, the monitoring module 220 may generate the reaction level of the passenger(s) in different ways and to include different sets of information as, for example, may be defined by the criteria 260. In one aspect, the monitoring module 220 generates a separate reaction level for each individual passenger within the vehicle. Alternatively, the monitoring module 220 may generate the reaction level together as a combined determination for the passengers in the vehicle 100 or for those passengers that the monitoring module 220 identifies as being aware of the surroundings.

Moreover, the monitoring module 220, in one embodiment, produces the reaction level including an assessment of the reaction of the passenger while further including an indication of awareness of the passenger. The reaction level includes, for example, a quantization of the reaction on a scale (e.g., 0-100) where a level of "0" indicates complete calm/no stress, whereas "100" indicates a highly stressed/emergency state. In general, the monitoring module 220 generates the quantization of the reaction according to correlations with various aspects of the state information. For example, the monitoring module 220 may initially monitor the passenger for a defined period of time, or over multiple trips to develop a baseline for behaviors/actions and physiological responses of the passenger. Alternatively, or additionally, the monitoring module 220 may also use a predefined baseline that is generic to general attributes of the passenger (e.g., height, age, weight, etc.) until the monitoring module 220 develops the passenger-specific baseline.

In either case, in one embodiment, the monitoring module 220 generates the reaction level by comparing the baseline with the perceived state information. In one approach, the monitoring module 220 uses a heuristic, as may be defined by the criteria 260, to assess state information in light of the baseline. For example, the monitoring module 220, in one approach, assigns weights to different behaviors or categories of behaviors, to different physiological responses, and so on. As a result, the monitoring module 220 produces a value for the reaction level that characterizes the reaction of the passenger. Furthermore, as an additional attribute of the reaction level, the monitoring module 220 may indicate a general direction/focus of the passenger's attention in relation to a direction relative to a heading of the vehicle 100 (e.g., 0-360 degrees) including an elevation. In still further aspects, the reaction level indicates attributes of the reaction of the passenger according to various categories. The categories can define behaviors, physiological responses, etc. Thus, the monitoring module 220 can individually assess a combination of responses according to the categories to individually characterize the reaction of the passenger at a fine granularity as opposed to a coarse overall assessment.

Moreover, the monitoring module 220, in one or more embodiments, generates the reaction level to further indicate the awareness of the passenger, which may be included as a confidence score about the reliability of the current reaction of the passenger relating to the surrounding environment. In other words, the monitoring module 220 further uses the state information about the passenger(s) to determine an operating awareness that characterizes awareness/vigilance of the passenger in relation to the surrounding environment. Essentially, the monitoring module 220 is capturing whether the passenger is attentive to the actions of the vehicle 100 in relation to the surrounding environment. By way of example, consider that a passenger is engaged with a tablet computer and watching a horror movie instead of being vigilant about the surrounding environment and actions of the vehicle 100. Thus, as the movie progresses, the behaviors/physiological responses of the passenger may fluctuate significantly in relation to the media on the tablet computer; however, these reactions have minimal or no direct correlation with the surrounding environment and operation of the vehicle 100. As such, if the monitoring module 220 assesses the reaction level without regard to awareness/vigilance of the passenger in relation to the vehicle 100 and the surrounding environment, then such an assessment may result in inaccurate determinations.

Accordingly, the monitoring module 220 computes the awareness, in one approach, as an engagement level that is based, at least in part, on the state information. That is, the monitoring module 220 uses the state information to characterize whether the passenger is presently engaged with the vehicle 100 and the environment around the vehicle 100. In general, the monitoring module 220 generates the awareness as a quantization that represents an extent to which the operator is engaged with how the vehicle 100 is being controlled (e.g., manually, semi-autonomously, or autonomously) and is aware of situational/contextual information about operation of the vehicle 100. Accordingly, the monitoring module 220 can generate the awareness as an assessment of a present mental state of the passenger in relation to whether the passenger is engaged and aware of the operation of the vehicle 100. In the context of an autonomous vehicle, the monitoring module 220 can compute the awareness to account for both the present mental state of the passenger and a readiness of the passenger/operator to manually control the vehicle 100 in the event of a handover from autonomous/semi-autonomous operation to manual operation.

Thus, by way of a brief example, the monitoring module 220 can, for example, electronically access the state information including information about a gaze of the operator. As such, in one approach, the monitoring module 220 assesses the information about a gaze of the operator and, more particularly, a duration for which the operator has been gazing in a particular location/direction and/or a frequency of gazing in the direction. From this assessment and according to, for example, defined criteria 260 that characterizes the state information in relation to awareness (e.g., a statistical or other model), the monitoring module 220 can characterize the engagement/awareness of the passenger and whether the passenger is vigilant about control of the vehicle 100. For example, in various approaches, the monitoring module 220 considers whether the gaze is directed toward the roadway in front of the vehicle 100, whether the gaze is tracking objects around the vehicle 100, whether the gaze is checking instrument readings, and so on. From this assessment and the assessment of other such factors, the monitoring module 220 can produce a likelihood of the operator being aware.

In further aspects, the monitoring module 220 undertakes a more complex analysis in order to compute the awareness/vigilance of the passenger. For example, in one approach, the monitoring module 220 can further consider correlations with dynamic vehicle data when computing the awareness. In one embodiment, the dynamic vehicle data can include various aspects of the vehicle 100 and aspects about the environment. Thus, the dynamic vehicle data can include GPS coordinates of the vehicle 100, vehicle telematics, roadway types (e.g., highway vs city), terrain characteristics (e.g., flat/plain surroundings vs feature-filled), duration of travel, weather conditions, time of day, level of traffic, current speed, infotainment information (e.g., whether a radio is playing, etc.), temperature, number of passengers, and other data collected by the monitoring module 220 from different sensors and systems of the vehicle 100.

Thus, to compute the awareness of the passenger, the monitoring module 220, in one embodiment, analyzes the state information along with the additional information (e.g., the dynamic vehicle data) to quantize an extent of awareness (e.g., mental state/vigilance) by the passenger. In general, the monitoring module 220 identifies the various data elements in relation to the noted model or other criteria, which provides, for example, likelihoods of awareness about the surrounding environment. Consequently, the monitoring module 220 can provide the overall likelihood of awareness as a particular classification (e.g., 0-10), according to individual aspects (e.g., a degree of skill/awareness needed to navigate current surroundings) of the present operating environment, as a discrete hard-coded determination (e.g., aware vs not aware), or another defined output.

In further embodiments, the monitoring module 220 implements a computational model such as a machine learning logic, deep learning logic, a neural network model, or another similar approach to assess the combination of information and produce the assessment about the awareness of the passenger. In either case, the monitoring module 220, when implemented as a neural network model or another computational model, in one embodiment, electronically processes the state information and other electronic data (e.g., dynamic vehicle data) as inputs to the model. Accordingly, the monitoring module 220, in concert with the computational model, produce the awareness as an electronic output that characterizes an extent of awareness as an attribute of the reaction level thereby indicating a confidence/reliability score for the reaction level itself.

Additionally, while the use of many different sources and forms of data are described as being part of how the monitoring module 220 computes the awareness, in various embodiments, the particular data can vary according to different aspects of the implementation. In any case, the present examples are intended for purposes of illustration and should not be construed as a limiting form of the disclosed data elements and functions. Moreover, it should be appreciated that the discussed state information and additionally discussed electronic data can be, in one embodiment, collected and used to train the computational model to provide a custom determination for a particular passenger.

As will be discussed in greater detail subsequently, the introspection system 170 characterizes the reaction level in relation to, in one embodiment, an expected reaction as predicted according to the situational awareness of the vehicle 100. The introspection system 170 can then use the comparison of the perceived reaction level against the expected reaction to determine whether the situational awareness of the vehicle is incomplete or otherwise inaccurate.

The situational awareness of the vehicle 100, as used herein, generally refers to perceptions, and plans of the vehicle 100 as developed by various systems within the vehicle 100 such as the autonomous driving module 160. In other words, the situational awareness of the vehicle is embodied according to analysis of sensor data (e.g., objects, trajectories, etc.) about the surrounding environment and sensor data (e.g., vehicle dynamics) about the vehicle 100 itself and how the perceived aspects of the environment may influence the vehicle 100 and a path of the vehicle 100 as, for example, potential collisions, paths, control dynamics, navigation choices, etc.

Thus, as mentioned, the introspection system 170 acquires additional information as part of the sensor data 250. In one embodiment, the inspection module 230 generally includes instructions that function to control the processor 110 to execute various actions in support of the introspection system 170. For example, in one embodiment, the inspection module 230 receives the sensor data 250 and uses the sensor data 250 to independently generate the situational awareness of the vehicle 100. Alternatively, or additionally, in one or more embodiments, the inspection module 230 retrieves operating characteristics that includes information embodying the situational awareness of the vehicle 100 from the autonomous driving module 160 and/or other such systems of the vehicle 100 that generate such information.

Thus, the inspection module 230, in one embodiment, queries, sniffs, or otherwise actively or passively acquires the information from the noted components that comprise the situational awareness. In general, the information that embodies the situational awareness includes the noted perceptions and plans. The perceptions are generally developed understandings about the surrounding environment that a respective system generates from observations embodied in the sensor data 250. The perceptions can include, for example, surrounding lanes and vehicles/obstacles that may be present in the lanes, objects along a roadway, signs, pedestrians, traffic signals, and other aspects that, for example, influence a path and/or control decisions of the vehicle 100 through the environment. The perceptions generally further include attributes of the noted aspects such as sizes, locations, trajectories, and other features.

Moreover, the autonomous module 160 or another system generally implements various routines for performing object detection and recognition, localization, lane marker/boundary identification, and so on. Thus, the autonomous module 160, in one embodiment, uses the sensor data 250 to identify approaching vehicles, characteristics of the approaching vehicles (e.g., size, speed, etc.), environmental characteristics (e.g., weather, road conditions, etc.), operational characteristics of the vehicle 100, and other information that informs the module 160 or other system about the surrounding environment and how to control the vehicle 100 therein. Thus, the inspection module 230 employs techniques that are either active or passive to acquire the operating characteristics including developed perceptions of the vehicle from the noted systems.

For example, the inspection module 230 may passively sniff the information from a stream of electronic information provided by the components within the vehicle 100. Moreover, the inspection module 230 can actively query/communicate with the noted systems/modules to acquire the information. Moreover, the noted systems may also provide the information at regular intervals as an internal reporting function to the inspection module 230. In one approach, the inspection module 230 analyzes the internal perceptions (e.g., determinations from sensor data), attributes of the perceptions, and plans from the noted systems of the vehicle 100. In this way, the inspection module 230 acquires the information that embodies the situational awareness of the noted systems and generates the expected reactions therefrom.

In one embodiment, the expected reactions indicate, for example, expected physiological responses and/or behaviors/actions that correlate with what is occurring around the vehicle 100 at a given time. In further aspects, the expected reaction indicates additional information about the situational awareness of the vehicle 100 that the inspection module 230 uses as a point of comparison against the reaction level. Thus, the expected reaction may further include at least locations of potential threats (e.g., objects having an intersecting trajectory with the vehicle 100) in the surrounding environment and a current threat level to the vehicle from the potential threats (e.g., imminent, marginal, etc.).

By way of example, in driving conditions that are relatively simple and generally free of complexity/danger, the inspection module 230 indicates that the expected reaction would correlate with a baseline for the passenger and would not likely include any particular behaviors. By contrast, in driving conditions with heavy traffic, poor road conditions from weather (e.g., snowy, wet, etc.), and/or many possible collision threats (e.g., pedestrians/bicyclists weaving between traffic), the inspection module 230 generates the expected reaction to indicate elevated levels of stress (e.g., physiological responses such as increased heart rate, sweating, high blood pressure, etc.) and also various behaviors such as a gazing toward a potential threat, motioning toward objects/vehicles, clenched fists, furrowed brow, etc. Of course, the prior examples cannot fully grasp the spectrum of possible expected reactions that may correlate with different circumstances around the vehicle 100 for which the noted systems generate the situational awareness; however, the examples illustrate how the inspection module 230 generally considers the situational awareness of the vehicle 100 to predict the reactions of the passenger as embodied by the expected reactions.

As a general matter, the inspection module 230, in one embodiment, generates the expected reactions according to assigned values, and behaviors for different individual occurrences as perceived in the surrounding environment. That is, the inspection module 230 may implement a table with different categories of perceived aspects and expected reactions or values for physiological responses assigned thereto. Similarly, the table may include behaviors, whether a gaze of the passenger is expected to correlate, etc. Thus, the inspection module 230 uses the situational awareness of the vehicle along with the noted table, and, for example, a heuristic to generate the expected reaction. The inspection module 230 may implement the heuristic to combine and weigh the various factors as determined from the table into a combined expected reaction for the particular scenario. In this way, the inspection module 230 provides a point of comparison for the actual reaction level of the passenger.

Alternatively, or additionally, the inspection module 230, in one or more embodiments, leverages the previously described computational model or a separate such model to dynamically derive the expected reaction. That is, as previously noted, the monitoring module 220 may generate the reaction level of the passenger according to perceived sensor data and one or more computational models (e.g., deep neural network). Similarly, the inspection module 230, in one or more embodiments, leverages information learned by the computational models of the monitoring module 220 to generate the expected reaction. In still further aspects, the inspection module 230 trains a reaction model (e.g., deep neural network) over many observations to learn reactions that correlate with different external aspects of the surrounding environment and then uses the model to subsequently generate the expected reactions according to providing inputs about the situational awareness.

In either case, the expected reaction generally defines predicted reactions of a passenger as would be expected assuming that the situational awareness of the vehicle 100 aligns with what is actually perceived by the passenger. Consequently, knowing the actual reaction of the passenger and the expected reaction according to the situational awareness of the vehicle 100, the inspection module 230, in one approach, compares the expected reaction with the actual perceived reaction level to determine whether the vehicle 100 has accurately perceived the surrounding environment and whether the situational awareness is complete or not.

In one embodiment, the inspection module 230 is effectively inspecting determinations by the autonomous driving module 160 or other such systems by assessing whether what is perceived by the passenger corroborates with what is perceived by the vehicle 100. Of course, this comparison is underpinned by the assumption that the passenger is aware/vigilant in relation to the surrounding environment and actions of the vehicle 100 with respect thereto. As such, the inspection module 230, in one or more embodiments, initially confirms that the awareness of the passenger satisfies a confidence threshold (e.g., meets or exceeds). In various approaches, the inspection module 230 may define different tiers for the confidence threshold that define whether the inspection module 230 can rely on the reaction level to support performing further responsive actions. In other words, if the inspection module 230 determines that the expected reaction and the reaction level do not correspond, then the inspection module 230 may undertake certain responsive actions (e.g., executing an emergency pullover) when the awareness of the passenger satisfies a relatively higher confidence threshold (e.g., 95% certain the passenger is aware), whereas the inspection module 230 may execute other responsive actions (e.g., logging of information) when the reaction level satisfies a relatively lower confidence threshold (E.g., 50%).

Accordingly, the inspection module 230 compares the expected reaction with the reaction level to determine whether there is a correlation (also referred to as a match) therebetween. In one or more embodiments, the inspection module 230 compares the expected reaction and the reaction level by determining whether aspects of the expected reaction correspond with aspects of the reaction level within at least a defined margin. In other words, the inspection module 230 determines whether physiological responses (e.g., heart rate) identified in the expected reaction correspond to what is actually perceived in the reaction level within a range of error as defined by the margin (e.g., 10%). Similarly, the inspection module 230 determines whether actual observed actions/behaviors from the reaction level correspond with the expected reaction. Variations between actual and expected behaviors may vary depending on tendencies of particular passengers/occupants; however, as a general tenet, the inspection module 230 determines whether eye gaze and other indicators about locations of objects/threats in the environment correspond to actual actions/behaviors of the passenger. Moreover, the inspection module 230 also considers the presence of actions/behaviors (e.g., eye gaze, pointing, waving) that have no corresponding predicted counterpart in the expected behaviors. The inspection module 230, for example, generally attempts to correlate the gaze or gestures of the passenger with aspects in the surrounding environment as embodied within the situational awareness of the vehicle 100. Thus, when there is no correlation, the inspection module 230 may identify such an occurrence as a mismatch with the situational awareness.

Of course, while the inspection module 230 is discussed as performing a piecewise determination for the comparison, in further aspects, the inspection module 230 may implement alternative approaches to determine correspondence. For example, the inspection module 230, in one embodiment, implements a separate model (e.g., deep neural network) that accepts the expected reaction and the actual reaction level of the passenger as electronic input and provides a determination of the extent of correlation as an output. Such an output may also include a confidence interval for the determination specifying the overall reliability.

Once the inspection module 230 determines whether the expected reaction and the actual reaction of the passenger correspond or not, the inspection module 230 proceeds to, in one or more embodiments, execute one or more responsive actions. In general, the inspection module 230 executes a responsive action when the reactions do not match. Thus, the responsive actions are generally mitigating procedures that aim to resolve the disparity by accounting for inconsistencies in the situational awareness of the vehicle 100. Accordingly, the responsive actions can include passive and/or active actions and may be selectively executed based, at least in part, on characteristics of a situation.

For example, the responsive actions include, in one embodiment, logging information about the occurrence (e.g., expected reaction, reaction levels, situational awareness, raw sensor data, etc.), handing off control of the vehicle 100 to the occupant, handing off control of the vehicle 100 to a remote operator, offloading the processing of information about the surrounding environment and operation of the vehicle 100 to further refine determinations, and other such mitigating actions.

The inspection module 230 logs the information about the situational awareness of the vehicle 100 to provide an accounting of circumstances around the inconsistencies in the situational awareness of the vehicle 100. In other words, the inspection module 230 captures a snapshot of the state of the various systems including internal determinations/perceptions, plans, the sensor data 250 on which the determinations are based, and any other relevant information. The inspection module 230 stores the information in, for example, the data store 240, communicates the information to a cloud-based system, or otherwise saves the information so that additional analysis can be subsequently undertaken to identify a root cause and improve the system to avoid the inconsistency in the future.

The further responsive actions generally involve active responses that are directed to a more immediate resolution of the mismatch. For example, the inspection module 230, in one approach, offloads processing of the sensor data 250 and other relevant information that form the basis of the incomplete situational awareness. The inspection module 230 may offload the processing to additional onboard processing units such as infotainment processing units, or any other available processing resource. In additional aspects, the inspection module 230 offloads the processing to a cloud-based system to further analyze the information. In general, the inspection module 230 is offloading the information in order to leverage additional resources that may refine or otherwise execute more robust processing of the data to potentially resolve the source of the inconsistency. In this way, the inspection module 230 can recognize issues when they arise and take actions to attempt to resolve the issues on-the-fly.

In still further aspects, the inspection module 230 performs other actions such as executing an emergency pullover, executing a handover in control to a passenger/operator, executing a handover in control to a remote operator (e.g., via a wireless connection to a remote operating center), etc. The noted responsive actions are generally focused on preventing any potential negative outcome when, for example, some immediate threat that the autonomous/semi-autonomous system is unaware about is otherwise present. As a general matter, the inspection module 230 executes one or more of the responsive actions according to, for example, the confidence interval of the awareness of the passenger, the perceived immediacy of the reaction level of the passenger, and/or other cues present in the surrounding environment or about the vehicle 100 itself (e.g., vehicle dynamics such as speed). In either case, the introspection system 170 functions to identify circumstances where the situational awareness is incomplete or generally inaccurate and improve the functioning of associated systems through passively logging information for future refinement of the systems and/or through active mitigation of the occurrence.

Figure 3:
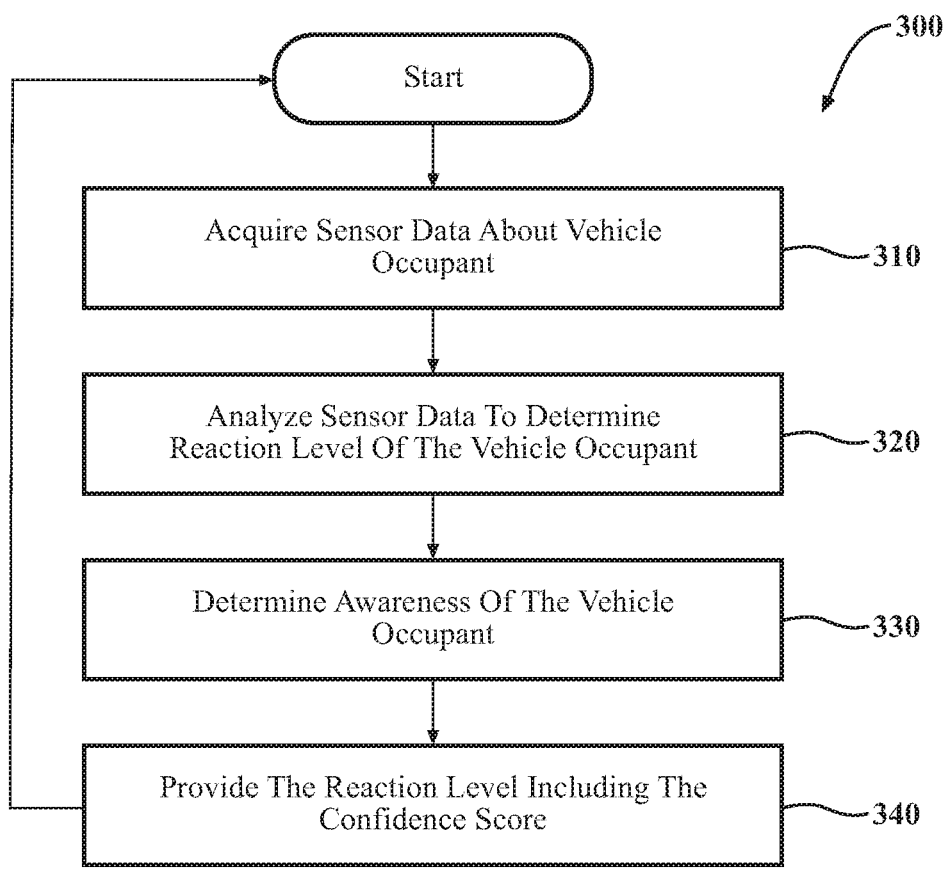
FIG. 3 is a flowchart illustrating one embodiment of a method associated with determining a reaction level of at least one vehicle occupant.

Additional aspects of improving the identification of incomplete/inaccurate situational awareness of vehicle systems will be discussed in relation to FIGS. 3 and 4. FIG. 3 illustrates a flowchart of a method 300 that is associated with determining information about passengers/occupants of a vehicle such as reactions and awareness levels. Method 300 will be discussed from the perspective of the introspection system 170 of FIGS. 1-2. While method 300 is discussed in combination with the introspection system 170, it should be appreciated that the method 300 is not limited to being implemented within the introspection system 170 but is instead one example of a system that may implement the method 300. Furthermore, methods 300 and 400 are illustrated as separate processes and generally function in parallel to, for example, iteratively assess the passenger(s) and the situational awareness of the vehicle. Of course, while the methods execute in parallel, the methods also function cooperatively to exchange information in support of determining whether the situational awareness is incomplete.

At 310, the monitoring module 220 acquires the sensor data 250 from the sensors of the sensor system 120. In one embodiment, the monitoring module 220 acquires the occupant sensor data 250 about at least one occupant within the vehicle 100. As previously noted, the occupant sensor data 250 can include many different observations of the occupant, which provide for the monitoring module 220 computing a comprehensive assessment of the reaction level.

As previously mentioned, the set of sensors can include cameras (visible light and/or infrared), heart rate monitors, microphones, and other sensors that provide observations about both physiological aspects and actions/behaviors of the occupant(s). In this way, the introspection system 170 can provide a comprehensive set of sensor data 250 about the occupant to categorize reactions accurately.

At 320, the monitoring module 220 analyzes the sensor data 250. In one embodiment, the monitoring module 220 analyzes occupant sensor data 250 about at least one occupant of the vehicle to generate a reaction level of the occupant. As previously explained, the reaction level characterizes at least a current response of the occupant to the surrounding environment and control of the vehicle 100 within the surrounding environment. Thus, the reaction generally specifies the reaction according to physiological responses (e.g., heart rate, breathing rate, etc.) of the occupant and actions (e.g., eye gaze) of the occupant. The physiological responses include autonomic responses of the occupant that occur reactively according to perceptions of the occupant about actions of the vehicle with respect to the surrounding environment and in relation to other aspects of the surrounding environment. Thus, the physiological responses can include stress reactions to threats in the surrounding environment.

Additionally, the actions of the occupant that the monitoring module 220 characterizes can include gestures and physical movements of the occupant including aspects such as eye gaze, pointing, waving, nodding, bracing, etc. Accordingly, the reaction level is capturing how the occupant(s) react to aspects of the environment that the occupants are perceiving.

At 330, the monitoring module 220 determines an operating awareness of the occupant that characterizes awareness of the occupant in relation to the surrounding environment. The monitoring module 220 generates the operating awareness as a confidence score about the reliability of the current reaction of the occupant to the surrounding environment. That is, because the reaction is reliable to an extent that the occupant is focused and aware of the surrounding environment, the operating awareness provides a reliability indicator about an extent to which the reaction can be trusted. Therefore, the monitoring module 220 generates the operating awareness, as previously explained, as part of the reaction level.

At 340, the monitoring module 220 provides the reaction level to the inspection module 230. In one embodiment, the monitoring module 220 provides the reaction level iteratively at defined intervals according to, for example, iterative executions of the method 300. Alternatively, or additionally, in one approach, the monitoring module 220 provides the reaction level on-demand according to instances when the inspection module 230 is to check the situational awareness of the vehicle 100. That is, depending on particular conditions associated with operation of the car, the inspection module 230 can, for example, check the situational awareness at different rates/intervals (e.g., more frequently in urban environments vs low-traffic highway driving), and/or at specific instances according to different occurrences (e.g., identifying error signals from sensors, etc.). In either case, the monitoring module 220 produces and provides the reaction level as a point of comparison against the situational awareness of the vehicle 100.

Figure 4:
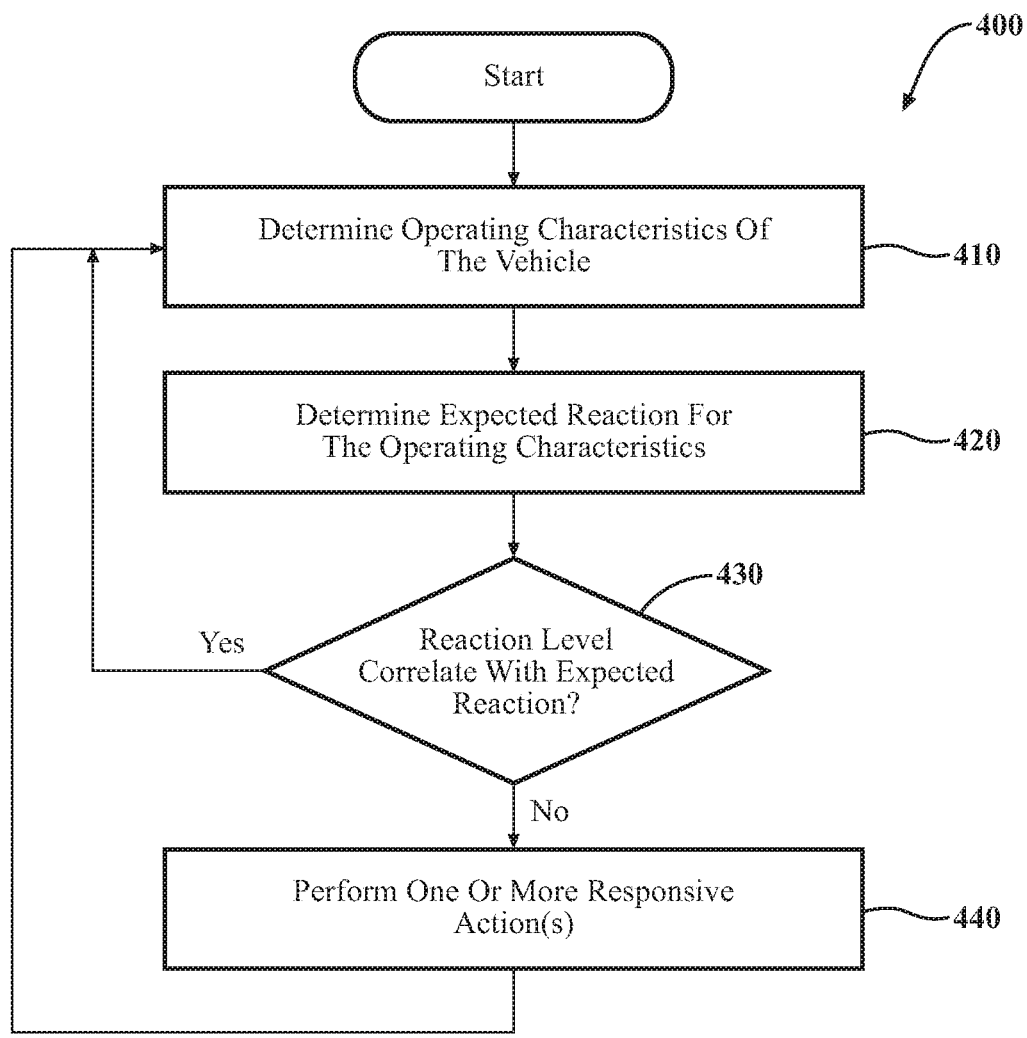
FIG. 4 is a flowchart illustrating one embodiment of a method associated with identifying inconsistencies in the situational awareness of the vehicle.

FIG. 4 illustrates an additional flowchart of a method 400 that is associated with identifying when a situational awareness of a vehicle is inconsistent with a surrounding environment. The method 400 will also be discussed from the perspective of the introspection system 170 of FIGS. 1-2. While method 400 is discussed in combination with the introspection system 170, it should be appreciated that the method 400 is also not limited to being implemented within the introspection system 170 but is instead one example of a system that may implement the method 400.

At 410, the inspection module 230 determines the operating characteristics of the vehicle 100. In one embodiment, the operating characteristics include aspects pertaining to the current situational awareness of the vehicle 100. Thus, the inspection module 230 may acquire and analyze internal perceptions and plans of the vehicle 100 to identify aspects of the environment perceived by the vehicle 100 and attributes of the perceptions. It should be appreciated that the inspection module 230 may selectively assess individual systems/modules within the vehicle 100 or assess the systems/modules as a collective. For example, the vehicle 100 can assess the situational awareness of an advanced driving assistance system (ADAS), a semi-autonomous system, and an autonomous system (e.g., autonomous driving module 160) as either a collective or individually depending on aspects of the respective implementations (e.g., shared information between the various systems). In either case, the inspection module 230 gathers information about internal perceptions and plans of the noted systems to provide the situational awareness for subsequent analysis.

At 420, the inspection module 230 determines the expected reaction of the passenger. In one embodiment, the inspection module 230 generates the expected reaction as a prediction of a response for the passenger that correlates with the operating characteristics. The expected reaction is a point of comparison for the reaction level that extrapolates the situational awareness into a context of the passenger(s) within the vehicle. As previously noted, the inspection module 230 can generate the expected reaction to indicate aspects such as locations of potential threats in the surrounding environment and a current threat level to the vehicle from the potential threats (e.g., as a point of reference for determining expected actions/behaviors), expected physiological responses corresponding to a level of stress expected for current driving conditions, and so on.

At 430, the inspection module 230 compares the expected reaction for the occupant(s) with the reaction level. The inspection module 230 compares the predicted/expected reaction with the observed/generated reaction level to determine whether the situational awareness of the vehicle 100 correlates with perceived awareness of the occupant(s) as embodied in the reaction level. As explained previously, the particular form of the comparison can vary according to the implementation; however, as a general matter, the inspection module 230 is comparing like aspects to determine whether the aspects are within a tolerance/margin so as to be considered similar/corresponding. In various approaches, the inspection module 230 considers the extent of correspondence/mismatch for the separate aspects when determining whether the expected and actual reactions align.

Moreover, inspection module 230 also considers the awareness of the occupant as a mechanism for assessing the reliability of the overall determination. In this way, the inspection module 230 performs the comparison to identify whether the situational awareness is incomplete/inaccurate. It should be noted that if the reactions do generally correspond, then the inspection module 230 proceeds back to iteratively assessing the situational awareness at block 410 as opposed to executing a responsive action.

At 440, in response to identifying that the reaction level does not correlate with the expected reaction, the inspection module 230 executes one or more responsive actions. The responsive actions account for inconsistencies in the situational awareness of the vehicle 100 by actively or passively mitigating the occurrence. As previously outlined, the inspection module 230 can execute one or more responsive actions according to, for example, particular conditions (e.g., awareness of the occupant). The responsive actions can include logging information about the situational awareness of the vehicle 100, handing off control of the vehicle 100 to the occupant, handing off control of the vehicle to a remote operator, offloading the processing of information about the surrounding environment and operation of the vehicle to further refine determinations comprising the situational awareness, and so on. In this way, the introspection system 170 improves the functioning of the noted systems by identifying the occurrence of inconsistencies/inaccuracies in the situational awareness and performing various responsive actions to correct the issues.

Figure 5:
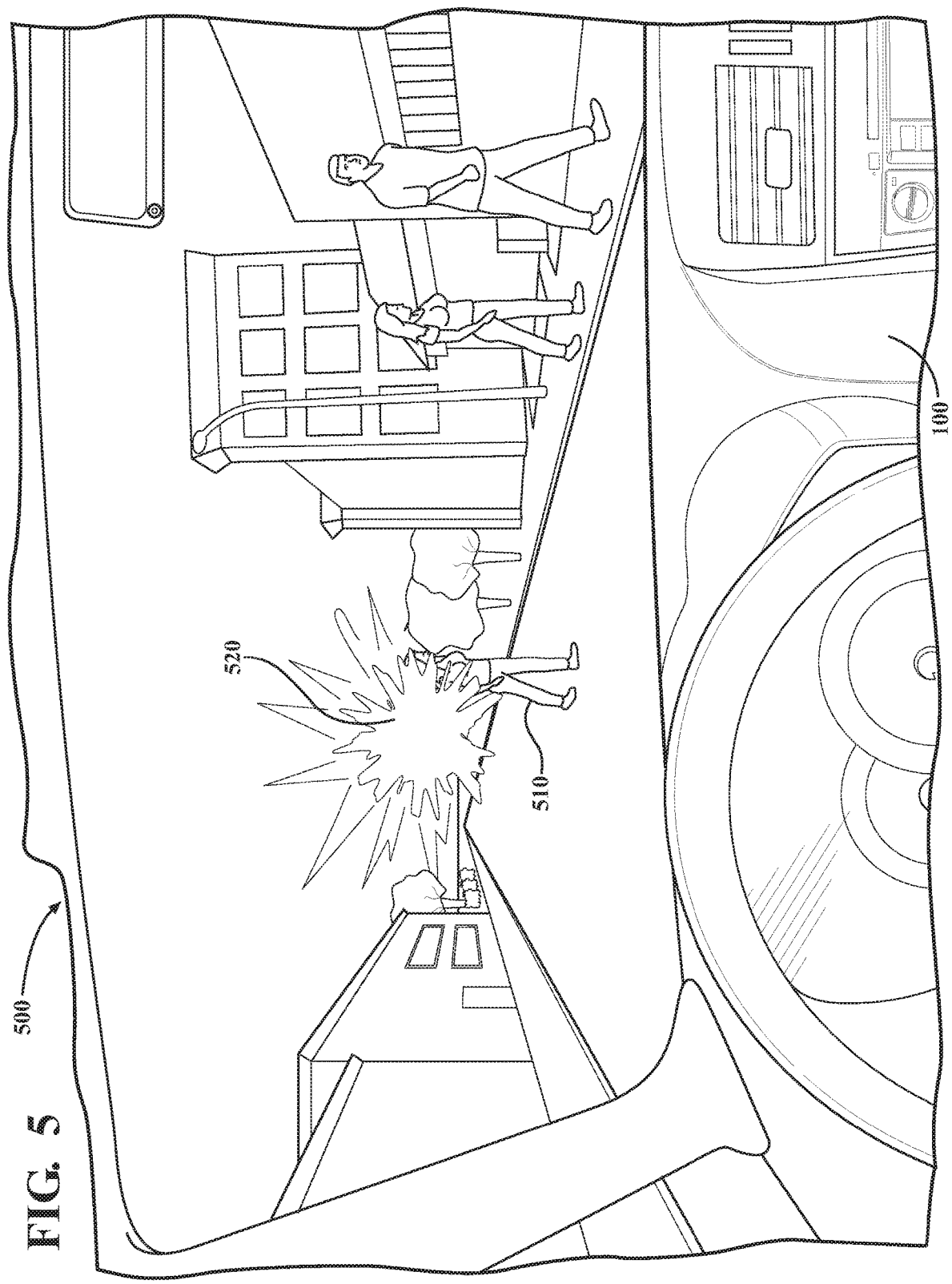
FIG. 5 illustrates one example scenario where the disclosed approach may identify inconsistencies in the situational awareness of the vehicle.

As a further explanation of how the introspection system 170 improves the identification and mitigation of the noted occurrences, the system 170 will now be discussed in relation to FIG. 5 and FIG. 6. FIG. 5 illustrates an exemplary scenario 500 of the vehicle 100 traveling along a road where pedestrians are present. As illustrated, a pedestrian 510 is walking within the roadway in front of the approaching vehicle 100. However, sun glare 520 from the sun is obstructing observations of the onboard sensors (e.g., a camera) from capturing the presence of the pedestrian 510. Accordingly, an occupant within the vehicle 100 that is aware of the presence of the pedestrian 510 and not blinded by the sun glare 520 is expected to exhibit an elevated reaction (e.g., heart rate, blood pressure, gestures/gaze, etc.) as would be perceived by the introspection system 170. However, because the sensors of the vehicle 100 do not perceive the pedestrian 510, an autonomous driving module 160, for example, may be unaware of the pedestrian 510. Thus, the expected reaction that correlates with the situational awareness of the vehicle 100 would likely be relaxed/calm. The introspection system 170, in the instant example, would identify the inconsistency between the actual reaction and the expected reaction and proceed to, for example, execute one or more responsive actions such as logging information about the occurrence, executing a handover in control of the vehicle 100 to the occupant (i.e., if operating autonomously), etc.

Figure 6:
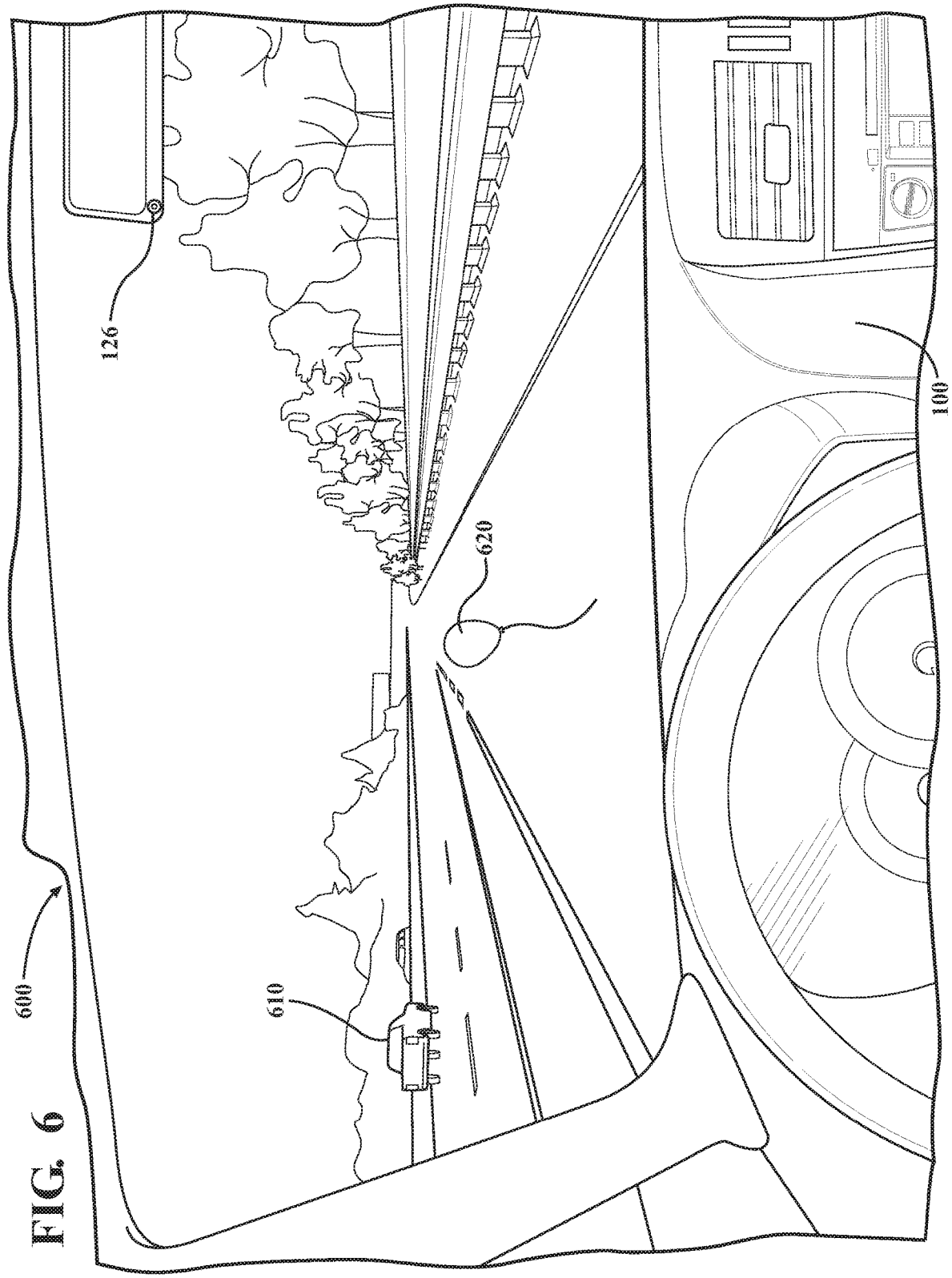
FIG. 6 illustrates another example scenario where the disclosed approach may identify inconsistencies in the situational awareness of the vehicle.

As a further example, FIG. 6 illustrates a scenario 600 involving the vehicle 100 driving along a highway where there is a distant vehicle 610 and an object 620 that are perceived by the systems of the vehicle 100. The object 620 is in a direct path of the vehicle 100 and interpreted by the vehicle system(s) as a threat because the vehicle 100 is about to collide with the object 620. However, the object 620 is actually not a threat and is misidentified by the internal perceptions. That is, the object 620 is a balloon, but the vehicle systems do not understand the character of the balloon 620, and therefore interpret the balloon to be a threat. Thus, the systems may initiate emergency maneuvers to avoid the balloon 620 even though it is unnecessary.

Accordingly, the introspection system 170 compares the reaction level of the passenger (e.g., relaxed/unconcerned about the balloon 620) with the expected reaction according to the situational awareness of the vehicle 100 (e.g., elevated due to the imminence of impact). The introspection system 170 would then, for example, log the information about the occurrence and also potentially warn the occupant, handover control so that the occupant can override the emergency maneuvers, or perform other appropriate actions. Consequently, the introspection system 170 is able to identify instances when the internal perceptions of the autonomous/automated systems may be inaccurate and take actions to facilitate improving the systems during the occurrence and for subsequent encounters.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the introspection system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the introspection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the introspection system 170, and/or the autonomous driving module(s) 160 may control some or all of these vehicle systems 140 and, thus, may be partially or fully autonomous.

The processor(s) 110, the introspection system 170, and/or the autonomous driving module(s) 160 can be operatively connected to communicate with the various vehicle systems 140 and/or individual components thereof. For example, returning to FIG. 1, the processor(s) 110, the introspection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the introspection system 170, and/or the autonomous driving module(s) 160 may control some or all of these vehicle systems 140.

The processor(s) 110, the introspection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the introspection system 170, and/or the autonomous driving module(s) 160 can control the direction and/or speed of the vehicle 100. The processor(s) 110, the introspection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the introspection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the inspection module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An introspection system for identifying when a situational awareness of a vehicle is inconsistent with a surrounding environment, comprising:
   one or more processors;
   a memory communicably coupled to the one or more processors and storing:
   a monitoring module including instructions that when executed by the one or more processors cause the one or more processors to analyze occupant sensor data about at least one occupant of the vehicle to generate a reaction level of the occupant, the reaction level characterizing at least a current response of the occupant to the surrounding environment and control of the vehicle within the surrounding environment; and
   an inspection module including instructions that when executed by the one or more processors cause the one or more processors to:
   compare an expected reaction for the occupant with the reaction level to determine whether the reaction level of the occupant correlates with the situational awareness of the vehicle about the surrounding environment, and
   in response to identifying that the reaction level does not correlate with the expected reaction, execute a responsive action to account for inconsistencies in the situational awareness of the vehicle.

2. The introspection system of claim 1, wherein the inspection module includes instructions to execute the response action including instructions to log information about the situational awareness of the vehicle to provide an accounting of circumstances around the inconsistencies in the situational awareness of the vehicle.

3. The introspection system of claim 1, wherein the inspection module includes instructions to execute the response action including instructions to execute one or more of handing off control of the vehicle to the occupant, handing off control of the vehicle to a remote operator, and offloading information about the surrounding environment and operation of the vehicle to further refine determinations about the surrounding environment by the vehicle, and
   wherein the offloading includes one or more of offloading processing to additional processing components within the vehicle and offloading the processing to cloud-based processing components that are remote from the vehicle.

4. The introspection system of claim 1, wherein the monitoring module includes instructions to acquire the occupant sensor data about at least the occupant within the vehicle, and
   wherein the monitoring module includes instructions to analyze the occupant sensor data including instructions to determine an operating awareness of the occupant that characterizes awareness of the occupant in relation to the surrounding environment, the reaction level including the operating awareness as a confidence score about reliability of the current response relating to the surrounding environment.

5. The introspection system of claim 1, wherein the monitoring module includes instructions to analyze the occupant sensor data including instructions to generate the reaction level according to one or more of physiological responses of the occupant and actions of the occupant,
   wherein the physiological responses include autonomic responses of the occupant associated with perceptions of the occupant about actions of the vehicle with respect to the surrounding environment, and
   wherein the actions of the occupant include one or more of gestures and physical movements of the occupant including at least eye gaze.

6. The introspection system of claim 1, wherein the inspection module includes instructions to determine operating characteristics for the vehicle that indicate the situational awareness of the vehicle in relation to the surrounding environment and
   determine the expected reaction of the occupant that correlates with the operating characteristics as a point of comparison for the reaction level, wherein the expected reaction indicates at least locations of potential threats in the surrounding environment and a current threat level to the vehicle from the potential threats.

7. The introspection system of claim 6, wherein the inspection module includes instructions to determine the operating characteristics including instructions to analyze internal perceptions and plans of the vehicle to identify aspects of the surrounding environment perceived by the vehicle and attributes of the perceptions.

8. The introspection system of claim 1, wherein the vehicle includes one or more of an advanced driving assistance system (ADAS), a semi-autonomous system, and an autonomous system that generate internal perceptions and plans of the vehicle in relation to the surrounding environment.

9. A non-transitory computer-readable medium for identifying when a situational awareness of a vehicle is inconsistent with a surrounding environment and including instructions that when executed by one or more processors cause the one or more processors to:
   analyze occupant sensor data about at least one occupant of the vehicle to generate a reaction level of the occupant, the reaction level characterizing at least a current response of the occupant to the surrounding environment and control of the vehicle within the surrounding environment;
compare an expected reaction for the occupant with the reaction level to determine whether the reaction level of the occupant correlates with the situational awareness of the vehicle about the surrounding environment; and
in response to identifying that the reaction level does not correlate with the expected reaction, execute a responsive action to account for inconsistencies in the situational awareness of the vehicle.

10. The non-transitory computer-readable medium of claim 9, wherein the instructions to execute the response action include instructions to log information about the situational awareness of the vehicle to provide an accounting of circumstances around the inconsistencies in the situational awareness of the vehicle.

11. The non-transitory computer-readable medium of claim 9, wherein the instructions to execute the response action include instructions to execute one or more of handing off control of the vehicle to the occupant, handing off control of the vehicle to a remote operator, and offloading information about the surrounding environment and operation of the vehicle to further refine determinations about the surrounding environment by the vehicle, and
wherein the offloading includes one or more of offloading processing to additional processing components within the vehicle and offloading the processing to cloud-based processing components that are remote from the vehicle.

12. The non-transitory computer-readable medium of claim 9, wherein the instructions further include instructions to acquire the occupant sensor data about at least the occupant within the vehicle, and
wherein the instructions to analyze the occupant sensor data include instructions to determine an operating awareness of the occupant that characterizes awareness of the occupant in relation to the surrounding environment, the reaction level including the operating awareness as a confidence score about reliability of the current response relating to the surrounding environment.

13. The non-transitory computer-readable medium of claim 9, wherein the instructions to analyze the occupant sensor data including instructions to generate the reaction level according to one or more of physiological responses of the occupant and actions of the occupant,
wherein the physiological responses include autonomic responses of the occupant associated with perceptions of the occupant about actions of the vehicle with respect to the surrounding environment, and
wherein the actions of the occupant include one or more of gestures and physical movements of the occupant including at least eye gaze.

14. A method of identifying when a situational awareness of a vehicle is inconsistent with a surrounding environment, comprising:
analyzing occupant sensor data about at least one occupant of the vehicle to generate a reaction level of the occupant, the reaction level characterizing at least a current response of the occupant to the surrounding environment and control of the vehicle within the surrounding environment;
comparing an expected reaction for the occupant with the reaction level to determine whether the reaction level of the occupant correlates with the situational awareness of the vehicle about the surrounding environment; and
in response to identifying that the reaction level does not correlate with the expected reaction, executing, by the vehicle, a responsive action to account for inconsistencies in the situational awareness of the vehicle.

15. The method of claim 14, wherein executing the response action includes logging information about the situational awareness of the vehicle to provide an accounting of circumstances around the inconsistencies in the situational awareness of the vehicle.

16. The method of claim 14, wherein executing the response action includes one or more of handing off control of the vehicle to the occupant, handing off control of the vehicle to a remote operator, and offloading information about the surrounding environment and operation of the vehicle to further refine determinations about the surrounding environment by the vehicle, and
wherein the offloading includes one or more of offloading processing to additional processing components within the vehicle and offloading the processing to cloud-based processing components that are remote from the vehicle.

17. The method of claim 14, further comprising:
acquiring the occupant sensor data about at least the occupant within the vehicle, wherein analyzing the occupant sensor data includes determining an operating awareness of the occupant that characterizes awareness of the occupant in relation to the surrounding environment, the reaction level including the operating awareness as a confidence score about reliability of the current response relating to the surrounding environment.

18. The method of claim 14, wherein analyzing the occupant sensor data includes generating the reaction level according to one or more of physiological responses of the occupant and actions of the occupant,
wherein the physiological responses include autonomic responses of the occupant associated with perceptions of the occupant about actions of the vehicle with respect to the surrounding environment, and
wherein the actions of the occupant include one or more of gestures and physical movements of the occupant including at least eye gaze.

19. The method of claim 14, further comprising:
determining operating characteristics for the vehicle that indicate the situational awareness of the vehicle in relation to the surrounding environment; and
determining the expected reaction of the occupant that correlates with the operating characteristics as a point of comparison for the reaction level, wherein the expected reaction indicates at least locations of potential threats in the surrounding environment and a current threat level to the vehicle from the potential threats.

20. The method of claim 19, wherein determining the operating characteristics includes analyzing internal perceptions and plans of the vehicle to identify aspects of the surrounding environment perceived by the vehicle and attributes of the perceptions.

* * * * *